US012748582B2

(12) United States Patent
Hitomi

(10) Patent No.: US 12,748,582 B2
(45) Date of Patent: Sep. 29, 2026

(54) USER ENVIRONMENT MANAGEMENT

(71) Applicant: Numecent Holdings, Inc., Irvine, CA (US)

(72) Inventor: Arthur S. Hitomi, Irvine, CA (US)

(73) Assignee: Numecent Holdings, Inc., Irvine, CA (US)

( * ) Notice: Subject to any disclaimer, the term of this patent is extended or adjusted under 35 U.S.C. 154(b) by 0 days.

(21) Appl. No.: 17/938,673

(22) Filed: Oct. 6, 2022

(65) Prior Publication Data

US 2023/0105105 A1 Apr. 6, 2023

Related U.S. Application Data

(60) Provisional application No. 63/252,941, filed on Oct. 6, 2021, provisional application No. 63/253,080, filed on Oct. 6, 2021.

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS 10,558,457 B1 * 2/2020 Kolb ......................... G06F 8/65
2012/0084752 A1 * 4/2012 Arnold ...................... G06F 8/63 717/121
2017/0046146 A1 * 2/2017 Jamjoom .................. G06F 8/62
2018/0139238 A1 * 5/2018 Schultz ............... H04L 63/0272
2018/0260301 A1 * 9/2018 Podjarny ............. G06F 16/2379
2019/0327281 A1 * 10/2019 Asnis ...................... H04L 67/52
2019/0332369 A1 * 10/2019 Gupta ....................... G06F 8/60
2020/0241863 A1 * 7/2020 Duvur ....................... G06F 8/65
2020/0241865 A1 * 7/2020 Phong ....................... G06F 8/71
2020/0257516 A1 * 8/2020 Totale ....................... G06F 8/71
2021/0072966 A1 * 3/2021 Zong ........................ H04L 67/60
2021/0141655 A1 * 5/2021 Gamage .............. G06F 9/45545
2021/0382703 A1 * 12/2021 Kurtev ...................... G06F 8/60
2022/0019455 A1 * 1/2022 Cao ..................... G06F 21/6218
(Continued)

*Primary Examiner* — Lewis A Bullock, Jr.
*Assistant Examiner* — Theodore E Hebert
(74) *Attorney, Agent, or Firm* — Ahmann Kloke LLP

(57) ABSTRACT

What is disclosed is incorporating a plurality of containers within a work pod, wherein the plurality of containers are associated with a corresponding plurality of applications; maintaining container versioning data and other container data for each of the plurality of containers, and work pod versioning data and other work pod data for the work pod; deploying a first instance of the work pod, wherein deployment to a desktop provides an end user with access to the corresponding plurality of applications; updating a first container of the plurality of containers within the work pod, wherein updating the first container includes an update to an application of the container; non-destructively updating container versioning data for the first container; on-destructively updating the work pod versioning data for the work pod; and deploying a second instance of the work pod, wherein deployment to the desktop provides the end user with access to the updated application.

20 Claims, 3 Drawing Sheets

(56) References Cited

U.S. PATENT DOCUMENTS

| | | | | |
|---|---|---|---|---|
| 2022/0035626 | A1* | 2/2022 | Kapoor | G06F 8/656 |
| 2022/0156156 | A1* | 5/2022 | Fazio | G06F 8/65 |
| 2022/0188170 | A1* | 6/2022 | Smith | G06F 9/547 |
| 2022/0244949 | A1* | 8/2022 | Iqbal | G06F 9/547 |
| 2022/0337417 | A1* | 10/2022 | Sanders | H04L 9/0643 |
| 2022/0350642 | A1* | 11/2022 | Poddar | G06F 21/53 |
| 2022/0407776 | A1* | 12/2022 | Pieczul | H04L 41/0893 |
| 2023/0065431 | A1* | 3/2023 | Kumar | G06F 9/445 |
| 2023/0088858 | A1* | 3/2023 | Tu | G06F 8/65 |
| 2023/0105105 | A1* | 4/2023 | Pfiffner | G06F 9/5077<br>717/169 |

* cited by examiner

USER ENVIRONMENT MANAGEMENT

CROSS REFERENCE TO RELATED APPLICATIONS

The present application claims benefit of U.S. Provisional Patent Application Ser. Nos. 63/252,941 and 63/253,080, entitled "SYSTEM AND METHOD FOR CLOUD CONTAINER MANAGEMENT FOR END-USER ENVIRONMENTS," and filed on Oct. 6, 2021, which is hereby incorporated by reference herein.

DETAILED DESCRIPTION

Figure 1:
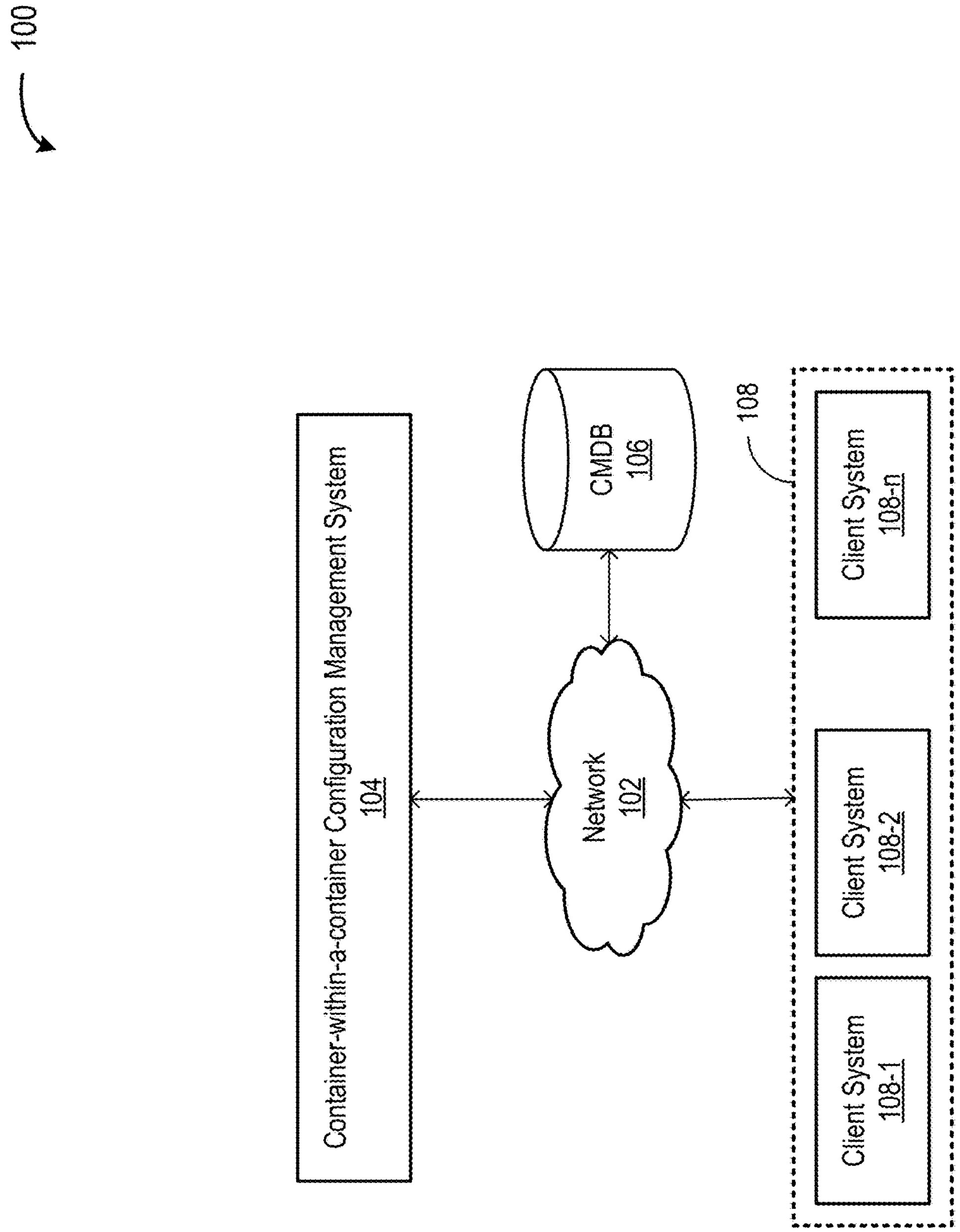
FIG. 1 is a diagram of an example of a system for software management and delivery.

Cloudpager is a modern Cloud-based Desktop Orchestration and User Environment Management (UEM) service for Cloudpaging containers and other container formats such as Microsoft's MSIX. Cloudpager (codename DAPP) uses the Cloudpaging application delivery framework to orchestrate and deliver containerized applications. Combined with Cloudpaging, Cloudpager provides end user application delivery, configuration management, UEM, and software asset management in a subscription-based service from the Cloud. Cloudpager is a rapid and highly scalable technology for managing and deploying everything the user needs for performing work in a desktop environment: applications and the user's environment, in a conflict and trouble-free manner.

The goal of Cloudpager is to allow a single IT administrator to actively and practically manage thousands of diverse desktops from a Cloud service that can manage thousands of diverse enterprises from a single desktop management console. Cloudpager's large software asset database allows for containerized software applications to be reusable across many computing environments. This, along with Cloudpager's UEM automates difficult configuration work performed repeatedly and needlessly by IT system administrators.

Cloudpager scales and auto-deploys Cloudpaging containers using a collaborative user interface and is a framework/platform that creates, enables, and supports complex user environments so that collections of applications, users, software assets (e.g., licenses), and artifacts can be grouped into a cohesive Workbench (or in CSCW terms, workspace or space), which is then gets mapped to an end-user desktop. Cloudpager allows administrators to create complex software tools environments and effectively manage and monitor software assets in an automated manner. Workbench is similar to Pods used in Kubernetes, except that Workbenches represent end-user units of work activities. Similar to Kubernetes, IT administrators utilizing Cloudpager can deploy containerized applications and Workbenches themselves to create their own desktop environment, have them deployed to their other devices, and maintain their work environment over time.

The Cloudpager model is based on decades of desktop management, application container, application virtualization, application streaming, and collaboration research and also uses the latest web technologies that support loosely coupled components to ensure that organizational and software asset and license models built in this system are extensible and easily maintainable with minimal effort. Today's system integrates heavily with the Windows desktop operating system though the system is architected to be independent of operating systems.

The Cloudpager system implements a client-server architecture. Node.js is used primarily to support the user interface interactions between both end users and administrators of the system. To support the loosely coupled and extensible data structures of the workspace model, MongoDB, an unstructured database repository is used to store the data and relationships. On the client side, DAPP supports the Windows desktop environment. The client is implemented in C/C++ and also uses node.js as the user interface platform. Node.js, based on Javascript, allows for easy modification of user interface code on a popular, modern, and supported platforms. Node.js supports a large userbase community, since it is based on Javascript. It shares the same language syntax on both the client and server side and therefore will allow for easy maintenance for many years to come.

DAPP is an online client-server framework, the system is designed to run the client over standard internet connection, working exclusively over HTTP (and HTTPS). DAPP will also run offline which helps Applications runs well over intermittently connected environments. These attributes are important as it aligns with the behavior of Cloudpaging. All of the components, including Cloudpaging Player will run over complex enterprise environments and are capable of running over the Internet and through Enterprise domains. On the server, Node.js is extremely scalable and for the purposes of this project will scale to any organization or can also handle multi-tenanted situations, though DAPP will not support inter-tenant communication at this time.

The DAPP Object Model is based around six main components: Space, App, App Set, App License, User/Roles, and Resources/Artifacts. All the components are loosely coupled, allowing for the relationships to be easily changed without strong dependencies between each of the objects. JSON allows for this loosely coupled object model to integrate well with Node.js and Mongo frameworks. This also allows Node.js and Mongo to interchange easily between other systems and data-stores including MS SQL and VB. Every object, including Space, App, App Set, App License, User/Roles, and Resources/Artifacts are JSON objects and are fully extensible. Certain objects within DAPP are considered primitives and contains primitive fields. We also extend the JSON attributes to allow for a hierarchically arrangement to support and model other objects we have in our datastore, such as structural and organizational models.

In DAPP, Space is the primary data structure that defines the collaborative instance of a work product. The Space can be copied, reused and transformed into other Spaces as templates to support work derivatives. Defined in Space are Apps and AppSets, AppLicenses, Users/Roles, and Artifacts generated by the Space over time. Spaces exists as an instance of work, and at any point in time, that instance can be copied to be used as a template to foster reuse and catalogued for new work or projects that they can rapidly create for the future. Though the catalogue is not required, it should exist as a simple directory to identify Spaces in small work groups or represent hierarchical organizations. Like any other data model in DAPP, the catalog can also have custom attributes defined to apply global attributes to all the spaces managed within DAPP or to a specific space instance. Since hierarchical relationships can be defined in DAPP, the ability to vary the scope of change can also be controlled.

Space uses a classic object oriented-like inheritance model based on JSON to help define attributes and allow attribute control from both a global and instance level. The Space can inherit property attributes of App, AppSet, AppLicense, User/Roles, and Resources/Artifacts. Furthermore, custom data models that are added (for example organizational details) are also applied to override any details within a space. Since the changes can be far-reaching, the concept of configuration management and versioning are integrated for runtime safety.

Apps (or applications) are software applications that are tightly coupled with Cloudpaging containers on the system (formally Jukebox). DAPP's App object itself can have arbitrary attributes defined and integrates tightly with Cloudpaging. Application primitive attributes include name, description, version, publisher, dependency list, conflict list, license and configuration. Configuration information includes and not limited to pre and post-condition handlers and the ability to pass and apply inherited attributes of the space. Dependency and conflict lists are defined and checked by the system to ensure that configurations and dependencies are validated in any space. Dependencies can be other apps as defined in DAPP, or system level prerequisites such as DirectX or .NET which can be either a system installation process or using the preferred method, containerized within Cloudpaging. Post condition handlers can also remove these dependencies if configured to do so, or DAPP can handle removing them if it sees a conflict within the existing environment, which can speed performance.

App Sets (or application sets) as its name implies, are sets of apps or applications. Beyond a simple list of applications, App Sets, can also have arbitrary attributes and combined with applications, artifacts, and configuration which can create a different solution that can be reused within DAPP's space framework.

App Licenses (or application licenses) have strong relationships to app or applications but are loosely coupled objects. Licenses are assigned to applications and can be assigned to specific spaces by organizational and/or functional requirements of the system. An App License can be assigned to a single application or multiple ones if necessary.

Resource and Artifact objects are system parameters and configurations to existing repository systems and file system resources. DAPP uses resource and artifacts objects to manage and track objects within the Space.

DAPP provides role support within the system. There are two main types of roles in the system: users and administrators. Users are end users who interact with the system. End users primarily interact with pre-defined Spaces which administrators provides access to. Administrators can fall into one of two categories—system administrators who are responsible for defining applications, creating organizational models, and applying attributes, and there are space managers who are responsible for changing a subset of attributes of the space such as user access and basic attribute changes. Administrators are effectively super users in this model.

An example of a scenario addressed with this technology includes upgrade (admin invoked) with rollback. Admin adds one upgraded application to the workbench, adds one new application to the workbench, removes one application from the workbench, and deploys and publishes the new workbench. User logs into the system and gets the new workbench on their desktop, the new applications come down onto their system and remove old ones, User logs into the system and is prompted to update their new workbench on their desktop. Admin needs to rollback the desktop and republishes an old desktop configuration. User logs into the system and is provided their old desktop, then decides to rollback their own desktop to the last working version.

Another example of a scenario addressed with this technology includes a storefront (ad hoc desktop configuration). User adds an application of their choice to their desktop. User gets their new application.

Another example of a scenario addressed with this technology includes rollback. Admin decides to reverse User's desktop to last known state (or time). User's new application disappears from their desktop.

Techniques associated with and improvements to the above-mentioned example will now be discussed. In the description below, applications, unless context dictates otherwise, are containers in the system (different versions of a container can be defined and managed); a workbench encapsulates a set of containers (applications) and runtime environment changes to allow users to get apps (changes to a Workbench are version controlled and used to provide upgrade paths to applications and their dependencies); storefronts are self-service portals that can use built-in end user Appstore, can integrate with Intunes, Citrix or other appstores, or the like (storefronts allow user invoked (adhoc) changes to occur on a user's desktop); and desktops are the work space of a user, regardless of whether the desktop is on a mobile device, laptop, or desktop computer (changes to an end users' desktop are tracked and all changes can be rolled back to an earlier known state to recover a user's environment in the event of a bad ad hoc (Storefront) or Workbench initiated change).

FIG. 1 is a diagram 100 of an example of a system for software management and delivery. The diagram 100 includes a computer-readable medium (CRM) 102, container-within-a-container configuration management system 104 coupled to the CRM 102, a work pod datastore 106 coupled to the CRM 102, and client systems 108-1 to 108-N (individually, the client system 108, collectively, the client systems 108) coupled to the CRM 102.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The container-within-a-container configuration management system 104 is intended to represent a server or equivalent device and engines coupled thereto. In a specific implementation, the server is hosted on a lightweight webserver, a webserver, or some other applicable device; provides a set of RESTful web services (or the equivalent) that can be called by a client (e.g., DAPP client) or third-party caller; and is platform independent. It may be desirable to allow server side to plug into third party authentication components to ensure flexibility and leverage any third-party authentication component, such as LDAP, Active Directory, Amazon, Facebook, Google, or others.

In a specific implementation, the container-within-a-container configuration management system 104 groups a set of applications together in a work pod. A work pod is a virtualization of a collection of applications that can be delivered as a group. In a specific implementation, some content of a work pod is pushed to distribution points (satellite locations) in accordance with the container-within-a-container configuration management system 104 determining where caches of content are distributed. A cache may include an entire work pod or a subset of the work pod that has been determined to be important for getting an application up and running even if not all of the application is yet available.

In a specific implementation, end users don't need to package software because drag-and-drop packages on the backend. For example, from a hosted desktop environment, an application, such as a WINDOWS® installer, can be dragged and dropped into a work pod. This allows installers to be uploaded and managed, auto-packaged. Advantageously, application software packages are reusable (as well as more compatible). Community features can be used for notifying availability, sharing, and reusing of applications.

In a specific implementation, the container-within-a-container configuration management system 104 provides a portal through which an administrator or other human or artificial agent of an organization can organize license keys, installers, lists of applications for employees or other human or artificial agents of the organization. For example, the container-within-a-container configuration management system 104 can put installers and artifacts available for drag-and-drop and do the packaging so the administrator does not have to, parking installers on the backend.

In a specific implementation, an admin defines applications, configures them, and makes them available for other admins or users to use the system. The admin is primarily responsible for defining the applications and the containers. Changes, especially global ones that are made within the system, are managed. Most changes that the administrator makes to the system can be reverted. Some changes, such as global ones, can be applied selectively to individual spaces to ensure that instances that may have adverse effects can be isolated out of configuration changes.

In a specific implementation, ITOM (IT Operations Management) provides features to control software license costs and run license usage and compliance reports. The ITOM can include offline application access and usage reporting for physical laptop deployments, enable dynamic provisioning of software licenses, and manage process loads by limiting runtime of applications for Azure Virtual Desktop (AVD) and Virtual Desktop Infrastructure (VDI) environments, and provide conflict management (e.g., store and identify problematic application and configuration issues before they are deployed onto desktops).

Figure 2:
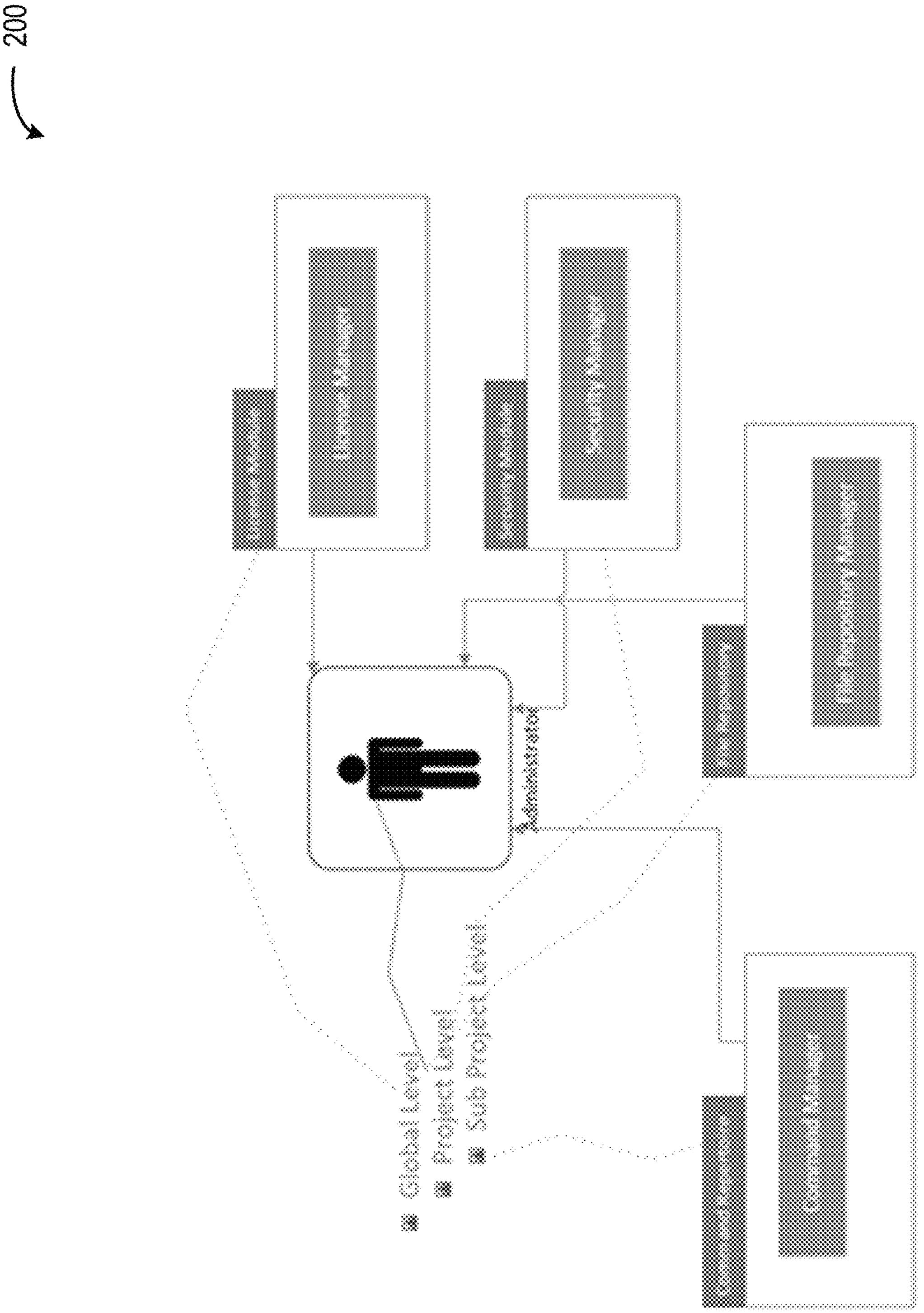
FIG. 2 is a diagram of an example of configuration of management and versioning.

If desired, sub-administrators can have limited roles. Limited administrator rights can be assigned to certain roles (and people) to allow for delegation of duties, including roles to handle licenses and application provisioning for a project or for the organization. FIG. 2, which is a diagram of an example of configuration of management and versioning, outlines some of those possibilities by way of example.

If desired, along with the administrator creating and deploying desktops to users, a user can also control deployment of their own desktops from the admin, and also go as far as defining a new configuration for the desktop. For example, pre and post conditional checks allow for end users to create and select certain applications for the desktop. End users generally consume or acquire applications made available by the administrator, but end users can/may also control the desktop by selecting if they want to enable a change initiated by the administrator, and also have the ability to revert a change if necessary.

In a specific implementation, the container-within-a-container configuration management system 104 optimizes delivery For example, the container-within-a-container configuration management system can provide an application profiling service in the background to profile what applications are needed, crowdsource to see how applications are launching to find the most important content to deliver first, and convert packages into a streaming format. Application profiling can assist in efficiently delivering software to satellite locations. Knowing where applications need to go to optimizes delivery ahead of time. Crowdsourcing can be used to figure out what is needed, which can be used to prioritize which pages are launched by all users. For example content can be distributed using page access to prefetch.

In a specific implementation, a work pod is a container with containers of the applications that allows a functional set of applications to be treated as a single application. Container (also referred to as wrapper or metafile) formats can include MSIX, MSI, and MSP, but other container formats can also be used, such as the Cloudpaging container. A container is used to define and run an application and supporting tools within the container. When you remove a containerized application, it does not, ideally, leave artifacts.

We run containers within containers, not just applications within a container, allowing for precise container management. In a specific implementation, a container suitable for including other containers to achieve container-within-a-container functionality includes one or more of (and ideally all of) improving compatibility of applications that run within it; isolating the application from the system; integrating the application with other parts of the system, tracking and controlling the application; and cleanly removing the application when it is done.

In a specific implementation, applications in a work pod are updated independently but kept configured together. As a set, the applications in a work pod can interact with other applications or the OS. In a specific implementation, you can also modify environmental variables for the work pod. For example, a work pod for a travel expense department might include WORD®, ADOBE®, and one or more SAP applications; parameters for default template directories for WORD and ADOBE can be set, a PDF button added to a toolbar, an ERP tool can be launched to submit a form into another system, and other travel expense related features can be added to the work pod. Environment variables (e.g., registry settings) specific between multiple applications (e.g., to share output to a specific directory) are one example of "glue" between applications. A common file could also be shared between multiple applications. Variables "outside the container" are also possible, such as wallpaper to show you are in a specific context, making sure only certain hardware devices are interacting within the container (e.g., you don't want other applications to take input from one device, but might be for another), there may be multiple datastores and you want one group of containers to talk to one datastore and another group of containers to take to another, or the like. The "glue" facilitates deployment of complex user desktop environments comprising applications, organizational policies, users profiles, licenses and artifacts without manual system administrator configuration. Event handers allow administrators to customize application and application set behaviors.

In a specific implementation, the container-within-a-container configuration management system 104 can configure and version control the applications as a group. This can include versioning capabilities of deployment configuration with logging. By versioning the applications together (and controlling parameters for grouping), the problems and introduced incompatibilities associated with independently updating applications used in association with one another (that are not in a work pod) can be mitigated. For example, the work pod keeps a set of containerized applications that can independently update in a container, which enables version control at the application level and the work pod level. Advantageously, with container management, image management can fall by the wayside.

In a specific implementation, auditing allows a person with applicable privileges to view the system at any given point in time. There may be multiple different methods of reviewing changes. For example, a first method of review is to view the changes from a changelog. The changelog is a read-only log of state changes of the system, identifying what state had changed, when, and by whom. The user interface will need to be able to present the system in a read-only state. A second method is to view the system back to another point in time.

In a specific implementation, the container-within-a-container configuration management system 104 tracks all relevant changes in the system. The sequence of changes is also tracked, in order.

In a specific implementation, the container-within-a-container configuration management system 104 performs modeling. Modeling allows human agents (e.g., admins, user admins, or end users) to see or make changes to the system before actually committing them to the system. Advantageously the human agents can view affected changes to the system before deciding to commit those changes to the system. Because system data is hierarchical, changes made towards or at the global level will affect all space dependencies, which can increase exponentially. An administrator will want to view the system before the change is committed.

In a specific implementation, a monotonic sequential counter is the only action guaranteed to be transactional. The monotonic counter is the finest granularity for sequencing state change. In some instances, such as for the purposes of MongoDB, it may be desirable to minimize transactional guarantees of the system.

In a specific implementation, multi-phase commit is implemented. For example, when a change is made by a parent, the dependent will be able to accept or reject the change, depending on the policy set by the dependent or the administrator in some cases. If a change is not accepted, an administrator may be notified that a change has been rejected. If no decision made on the change after a period of time, the system may notify the administrator that the policy has not been implemented. The policy change will apply for certain states of space (active, dormant, closed). For closed spaces, the system will not make any changes to the space. Dormant space will continually be updated, and active spaces will inquire or auto-update depending on the policy. If a change has not been committed by the space and a new update has been published which overrides a not yet committed change, then the system may be configured to override the stale update.

In a specific implementation, all aspects of an application are applied from a container withing a container perspective. This enables precise versioning control and may or may not include data. For comparison, current rollback technology is linear; you rollback a device to a particular time. However, frequently if something goes wrong, it isn't the last 5 hours that went wrong; it was probably some application update from long ago. Rollback within a container environment can use a snapshot of specific work pods, which is much lighter weight. You can also rollback for a user session inexpensively (because only delta-changing the application configurations, not binaries, is necessary). Especially in a server-based environment, where you traditionally cannot rollback for lots of users, we can remediate by restoring specific things that have gone wrong. Although there is no technological reason you could not rollback to "day 1," in a specific implementation, an admin can rollback to day 1, but a user admin has a less expansive rollback.

In a specific implementation, rolling back action to an earlier point in time will never remove nor erase versions recorded before the rollback. The rollback is appending and copying an earlier state as the next current state of the system, and therefore continuing to preserve the state before the rollback and before it. Moreover, if desired, when objects are marked for deletion, they will still be accessible from both a roll-back functionality and from an audit view.

In a specific implementation, updates do not happen on individual machines. The container-within-a-container configuration management system 104 facilitates applying updates to an application that can be tested within a work pod. Older to newer version constitutes an update (with other changes), but multiple applications can be updated at once (from the perspective of a user) by updating within a work pod. Advantageously, end users can rollback updates for individual applications or the work pod. Essentially, update/rollback is allowed on a per-user (or per-group) basis. A lot of systems today do not account for the fact an update can break things, using techniques such as image management and machine snapshots. The container-within-a-container configuration management system 104 provides a light-weight technique wherein updates can happen in a service computing environment in-session, without, e.g., taking a server down. Here, light-weight refers to a technique for configuration/rollback that does not use image management or machine snapshots. This lightweight technique for rollback can be referred to as "instant rollback" and can be applied to applications, application sets (e.g., a work pod), storefront, and other desktop configurations, including rollback of individual desktops.

The work pod datastore 106 is intended to represent a datastore of work pods and data, such as the data/content discussed in the preceding paragraphs, associated therewith. The work pod datastore 106 can comprise or be implemented as part of a Content Management DataBase (CMDB). In a specific implementation, the work pod datastore 106 includes a backend (e.g., DAPP) datastore that supports non-relational data and provides for switching data source and converting data.

The client systems 108 can function to receive input (e.g., user input), present information (e.g., graphical user interfaces), receive data, transmit data, and/or otherwise communicate with other systems (e.g., over a communication network). For example, the client systems 108 can received delivered applications in a work pod. Functionality of the client systems 108 can be performed by one or more computing devices and/or servers (e.g., a cloud-based server). In a specific implementation, the client systems 108 include a client web-based front end interface and a control agent. The control agent should integrate with the container-within-a-container configuration management system 104.

Figure 3:
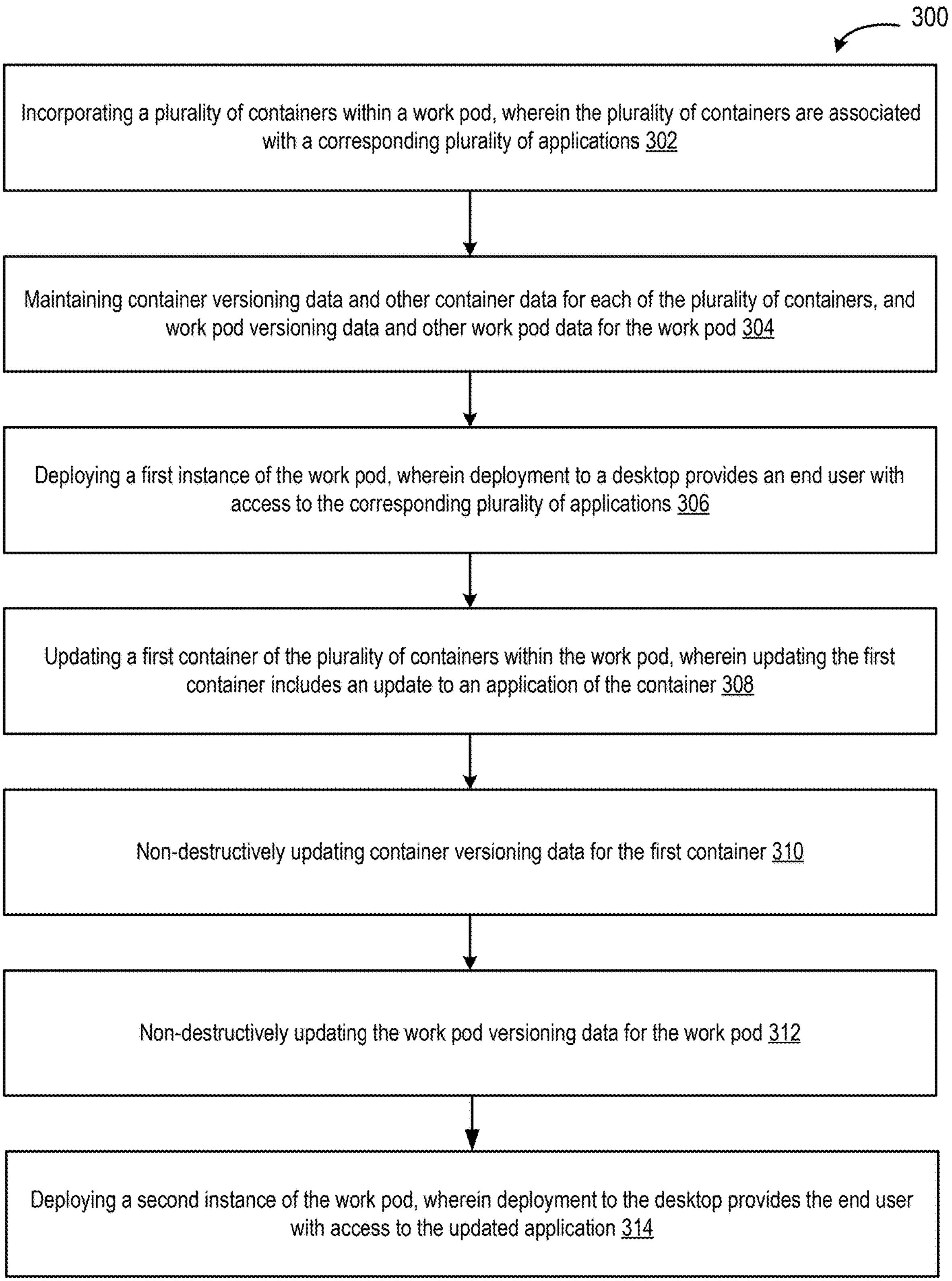
FIG. 3 is a flowchart of an example method of configuration of management and versioning.

An example method 300 of configuration of management and versioning is shown in FIG. 3 including modules 302-314.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A system comprising:

one or more processors; and memory storing instructions that, when executed by the one or more processors, cause the system to perform:

incorporating a plurality of containers within a work pod, wherein the plurality of containers are associated with a corresponding plurality of applications that are launched in a particular order;

maintaining container versioning data and other container data for each of the plurality of containers, and work pod versioning data and other work pod data for the work pod;

determining where caches of content of the work pod are distributed;

deploying, using an application profiling service and based on the determination of where the caches of content of the work pod are distributed, a first instance of the work pod to a desktop, wherein the deployment to the desktop provides an end user with access to the corresponding plurality of applications, wherein the application profiling service comprises a background process that uses crowdsourcing to determine how the corresponding plurality of applications are launched in order to prioritize which content of the caches of content to deliver first and determine which pages are launched by all users, wherein the content of the work pod is distributed using page access to prefetch;

updating a first container of the plurality of containers within the work pod, wherein updating the first container includes an update to an application of the container;

non-destructively updating container versioning data for the first container;

non-destructively updating the work pod versioning data for the work pod;

deploying, based on the determination of where the caches of content of the work pod are distributed, a second instance of the work pod, wherein deployment to the desktop provides the end user with access to the updated application.

2. The system of claim 1, wherein the content of the work pod comprises a virtualization of a collection of applications that can be delivered as a group.

3. The system of claim 2, wherein the virtualized applications of the work pod are updated independently but kept configured together.

4. The system of claim 2, wherein the instructions, when executed by the one or more processors, cause the system to perform:

modifying a plurality of environmental variables of the work pod, wherein at least a portion of the plurality of environmental variables are specific to a respective virtualized application of the virtualized collection of applications.

5. The system of claim 1, wherein the content of the work pod is distributed using page access to prefetch.

6. The system of claim 1, wherein deploying the first instance of the work pod includes pushing at least a portion of the content of the work pod to points at a plurality of satellite locations based on the determination of where the caches of content are distributed.

7. The system of claim 1, wherein the cache includes the entire work pod.

8. A method comprising:

incorporating a plurality of containers within a work pod, wherein the plurality of containers are associated with a corresponding plurality of applications that are launched in a particular order;

maintaining container versioning data and other container data for each of the plurality of containers, and work pod versioning data and other work pod data for the work pod;

determining where caches of content of the work pod are distributed;

deploying, using an application profiling service and based on the determination of where the caches of content of the work pod are distributed, a first instance of the work pod to a desktop, wherein the deployment to the desktop provides an end user with access to the corresponding plurality of applications, wherein the application profiling service comprises a background process that uses crowdsourcing to determine how the corresponding plurality of applications are launched in order to prioritize which content of the caches of content to deliver first and determine which pages are launched by all users, wherein the content of the work pod is distributed using page access to prefetch;

updating a first container of the plurality of containers within the work pod, wherein updating the first container includes an update to an application of the container;

non-destructively updating the container versioning data for the first container;

non-destructively updating the work pod versioning data for the work pod;

deploying, based on the determination of where the caches of content of the work pod are distributed, a second instance of the work pod, wherein deployment to the desktop provides the end user with access to the updated application.

9. The method of claim 8, wherein the content of the work pod comprises a virtualization of a collection of applications that can be delivered as a group.

10. The method of claim 9, wherein the virtualized applications of the work pod are updated independently but kept configured together.

11. The method of claim 9, further comprising:

modifying a plurality of environmental variables of the work pod, wherein at least a portion of the plurality of environmental variables are specific to a respective virtualized application of the virtualized collection of applications.

12. The method of claim 8, wherein the content of the work pod is distributed using page access to prefetch.

13. The method of claim 8, wherein deploying the first instance of the work pod includes pushing at least a portion of the content of the work pod to points at a plurality of satellite locations based on the determination of where the caches of content are distributed.

14. The method of claim 8, wherein the cache includes the entire work pod.

15. A non-transitory computer readable medium comprising instructions that, when executed, cause one or more processors to perform:

incorporating a plurality of containers within a work pod, wherein the plurality of containers are associated with a corresponding plurality of applications;

maintaining container versioning data and other container data for each of the plurality of containers, and work pod versioning data and other work pod data for the work pod;

determining where caches of content of the work pod are distributed;

deploying, using an application profiling service and based on the determination of where the caches of content of the work pod are distributed, a first instance of the work pod to a desktop, wherein the deployment to the desktop provides an end user with access to the corresponding plurality of applications, wherein the application profiling service comprises a background process that uses crowdsourcing to determine how the corresponding plurality of applications are launched in order to prioritize which content of the caches of content to deliver first and determine which pages are launched by all users, wherein the content of the work pod is distributed using page access to prefetch;

updating a first container of the plurality of containers within the work pod, wherein updating the first container includes an update to an application of the container;

non-destructively updating the container versioning data for the first container;

non-destructively updating the work pod versioning data for the work pod;

deploying, based on the determination of where the caches of content of the work pod are distributed, a second instance of the work pod, wherein deployment to the desktop provides the end user with access to the updated application.

16. The non-transitory computer readable medium of claim 15, wherein the content of the work pod comprises a virtualization of a collection of applications that can be delivered as a group.

17. The non-transitory computer readable medium of claim 16, wherein the virtualized applications of the work pod are updated independently but kept configured together.

18. The non-transitory computer readable medium of claim 15, wherein the content of the work pod is distributed using page access to prefetch.

19. The non-transitory computer readable medium of claim 15, wherein deploying the first instance of the work pod includes pushing at least a portion of the content of the work pod to points at a plurality of satellite locations based on the determination of where the caches of content are distributed.

20. The non-transitory computer readable medium of claim 15, wherein the cache includes the entire work pod.

* * * * *